United States Patent
Cho et al.

(10) Patent No.: US 9,973,022 B2
(45) Date of Patent: May 15, 2018

(54) NON-CONTACT TYPE POWER RECEIVING APPARATUS

(71) Applicant: SAMSUNG ELECTRO-MECHANICS CO., LTD., Suwon-si, Gyeonggi-do (KR)

(72) Inventors: Sang Ho Cho, Suwon-si (KR); Hyung Wook Cho, Suwon-si (KR); Sung Heum Park, Suwon-si (KR); Chang Mok Han, Suwon-si (KR); Jae Suk Sung, Suwon-si (KR); Jeong Man Han, Suwon-si (KR); Ki Won Chang, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 269 days.

(21) Appl. No.: 14/608,056

(22) Filed: Jan. 28, 2015

(65) Prior Publication Data
US 2016/0056636 A1    Feb. 25, 2016

(30) Foreign Application Priority Data

Aug. 20, 2014 (KR) ................. 10-2014-0108569

(51) Int. Cl.
*H02J 7/00* (2006.01)
*H02J 7/04* (2006.01)
*H02J 7/16* (2006.01)
*H02J 7/02* (2016.01)
*H02J 50/12* (2016.01)
*H02M 7/219* (2006.01)

(52) U.S. Cl.
CPC .............. *H02J 7/025* (2013.01); *H02J 7/022* (2013.01); *H02J 50/12* (2016.02); *H02M 7/219* (2013.01)

(58) Field of Classification Search
CPC ......................................................... H02J 7/025
USPC ............................................................ 320/108
See application file for complete search history.

(56) References Cited

U.S. PATENT DOCUMENTS

| 8,786,314 B2 | 7/2014 | Maruyama et al. |
| 2007/0217093 A1* | 9/2007 | Xue ................ H02M 1/10 361/18 |

(Continued)

FOREIGN PATENT DOCUMENTS

| CN | 102570626 A | 7/2012 |
| CN | 203707819 U | 7/2014 |

(Continued)

OTHER PUBLICATIONS

Chinese Office Action dated Jan. 10, 2018 in counterpart Chinese Patent Application No. 201510077276.4 (18 pages, in Chinese with English translation).

*Primary Examiner* — Edward Tso
*Assistant Examiner* — Ahmed Omar
(74) *Attorney, Agent, or Firm* — NSIP Law

(57) ABSTRACT

A non-contact type power receiving apparatus, of which a voltage level of output power varies depending on a rated voltage of a battery, includes: a power receiving coil unit receiving a power in a non-contact scheme; a rectifying/multiplying unit rectifying the received power depending on controlling thereof and selectively multiplying a voltage level of the rectified power; and a controller selectively controlling a rectifying operation or a multiplying operation of the rectifying/multiplying unit to be performed depending on a selection signal.

18 Claims, 10 Drawing Sheets

(56) References Cited

U.S. PATENT DOCUMENTS

| | | | |
|---|---|---|---|
| 2012/0127765 A1* | 5/2012 | Maruyama | H02J 5/005 363/126 |
| 2012/0134180 A1* | 5/2012 | Watanabe | H02M 3/1584 363/17 |
| 2013/0127405 A1 | 5/2013 | Scherer et al. | |

FOREIGN PATENT DOCUMENTS

| | | |
|---|---|---|
| JP | 10-248183 A | 9/1998 |
| JP | 2006-230129 A | 8/2006 |
| KR | 10-2013-0054897 A | 5/2013 |

\* cited by examiner

NON-CONTACT TYPE POWER RECEIVING APPARATUS

CROSS-REFERENCE TO RELATED APPLICATION

This application claims the benefit of Korean Patent Application No. 10-2014-0108569 filed on Aug. 20, 2014, with the Korean Intellectual Property Office, the disclosure of which is incorporated herein by reference.

BACKGROUND

The present disclosure relates to a non-contact type power receiving apparatus capable of charging a battery with power by receiving the power in a non-contact scheme.

An electronic apparatus is operated using electricity as an energy source.

Electrical power, an energy source, needs to be supplied to operate an electronic apparatus. Such an electronic apparatus may be driven with power generated through self power generation or receive externally supplied power.

In order for the electronic apparatus to receive the externally supplied power, a power supplying apparatus for transferring the power from an external power supplying facility to the electronic apparatus is required.

As the power supplying apparatus, generally, a contact type power supplying apparatus directly connected to the electronic apparatus by a connector, or the like, is used to supply power to a battery embedded in the electronic apparatus. Alternatively, power may be supplied to the battery embedded in the electronic apparatus in a non-contact scheme as in the following Related Art Document.

Meanwhile, rated voltages of the battery may be different from each other for each electronic apparatus. Circuit configurations of the non-contact type power receiving apparatus may be different from each other for each rated voltage of the battery. It may be difficult to use a circuit in common. Therefore, manufacturing costs may be increased.

SUMMARY

An aspect of the present disclosure may provide a non-contact type power receiving apparatus in which a voltage level of output power is varied depending on a rated voltage of a battery.

According to an aspect of the present disclosure, a non-contact type power receiving apparatus may include: a power receiving coil unit receiving power in a non-contact scheme; a rectifying/multiplying unit rectifying the received power depending on controlling thereof and selectively multiplying a voltage level of the rectified power; and a controlling unit selectively controlling a rectifying operation or a multiplying operation of the rectifying/multiplying unit to be performed depending on a selection signal.

According to another aspect of the present disclosure, a non-contact type power receiving apparatus may include: a power receiving unit outputting one of a first power generated by rectifying power received in a non-contact scheme and a second power generated by rectifying and multiplying the power depending on a selection signal; and a battery providing the selection signal depending on a preset rated voltage to thereby be charged with power corresponding to the rated voltage, of the first power and the second power.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Figure 1:
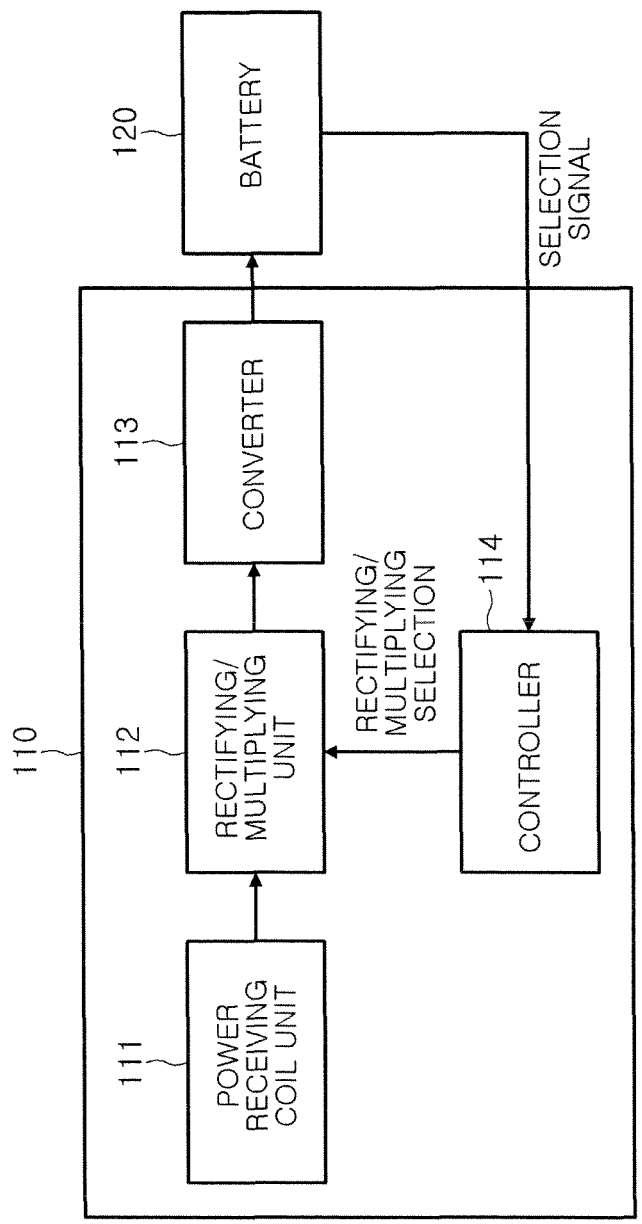
FIG. 1 is a schematic block diagram of a non-contact type power receiving apparatus according to an exemplary embodiment of the present disclosure.

Hereinafter, embodiments of the present disclosure will be described in detail with reference to the accompanying drawings.

The disclosure may, however, be embodied in many different forms and should not be construed as being limited to the embodiments set forth herein. Rather, these embodiments are provided so that this disclosure will be thorough and complete, and will fully convey the scope of the disclosure to those skilled in the art.

In the drawings, the shapes and dimensions of elements may be exaggerated for clarity, and the same reference numerals will be used throughout to designate the same or like elements.

FIG. 1 is a schematic block diagram of a non-contact type power receiving apparatus according to an exemplary embodiment of the present disclosure.

Referring to FIG. 1, the non-contact type power receiving apparatus according to an exemplary embodiment of the present disclosure may include a power receiving unit 110 and a battery 120.

The power receiving unit 110 may vary a voltage level depending on a selection signal from the battery 120 and provide a first power or a second power to the battery 120.

The power receiving unit 110 may include a power receiving coil unit 111, a rectifying/multiplying unit 112, a converter 113, and a controller 114.

The power receiving coil unit 111 may receive power from the outside in a non-contact scheme.

Here, the non-contact scheme may mean a scheme in which a direct connection is not made between conductors of a transmit side and a receive side in a process of transmitting power from the transmit side to the receive side and may be called a contactless scheme, a wireless transmitting scheme, or the like.

The rectifying/multiplying unit 112 may perform a rectifying operation or rectifying and multiplying operations depending on controlling of the controller 114 and transfer rectified power or power that is rectified and has a multiplied voltage level to the converter 113.

The converter 113 may convert the power from the rectifying/multiplying unit 112 into charging power and transfer the charging power to the battery 120.

The battery 120 may provide the selection signal to the controller 114 depending on its rated voltage, and the controller 114 may control an operation of the rectifying/multiplying unit 112 depending on the selection signal of the battery 120 to control the rectifying operation or the rectifying and multiplying operations to be performed.

Figure 2A:
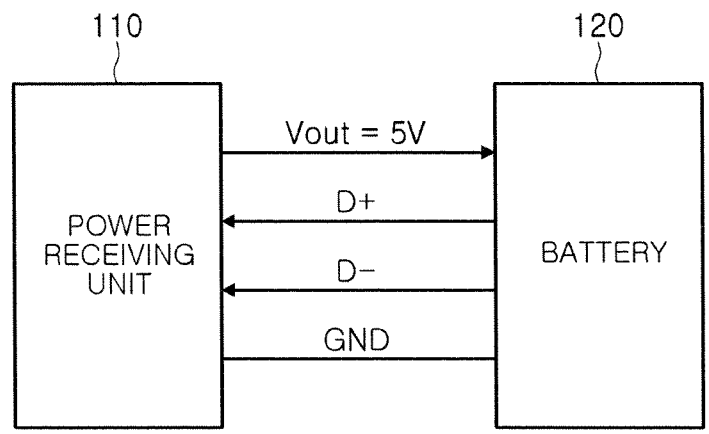
FIGS. 2A and 2B are block diagrams schematically illustrating a selective operation of the non-contact type power receiving apparatus according to an exemplary embodiment of the present disclosure.
Figure 2B:
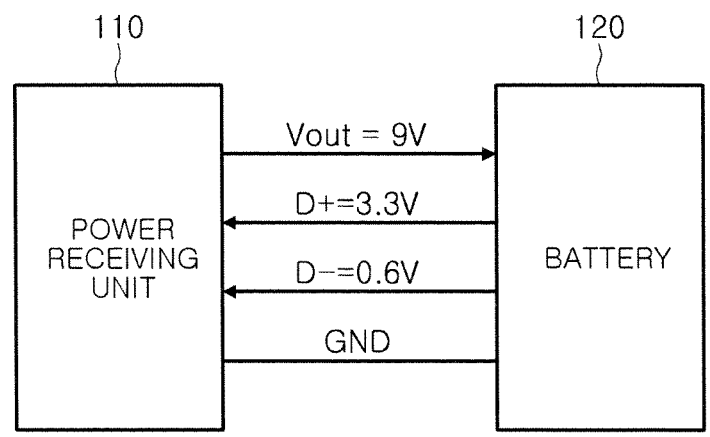

FIGS. 2A and 2B are block diagrams schematically illustrating a selective operation of the non-contact type power receiving apparatus according to an exemplary embodiment of the present disclosure.

Referring to FIG. 2A together with FIG. 1, data lines D+ and D− may be electrically connected between the power receiving unit 110 and the battery 120 to control an operation of the rectifying/multiplying unit 112 or the converting unit 113 depending on a charging state of the battery 120 to control the charging power transferred to the battery 120.

Here, in the case in which a separate signal is not present from the battery 120, the charging power having a preset voltage level, for example, 5V may be provided.

Referring to FIG. 2B, in the case in which a rated voltage of the battery 120 is different from a voltage level of a first charging power, the battery 120 may transfer the selection signal through the data lines D+ and D−.

For example, in the case in which the voltage level of the first charging power is 5V and the rated voltage of the battery 120 is 9V, the power receiving unit 110 may provide a second charging power having a voltage level of 9V, which is different from that of the first charging power, to the battery 120 depending on a selection signal form the battery 120. The selection signal may be generated depending on voltage levels applied to the data lines D+ and D−. For example, when the data line D+ has a voltage level of 3.3V and the data line D− has a voltage level of 0.6V, the selection signal may be generated.

On the other hand, even in the case in the charging power charged in the battery 120 is 9V, when the rated voltage of the battery 120 is 9V, the selection signal may be provided, and a voltage level of the charging power charged in the battery 120 may be maintained.

Figure 3:
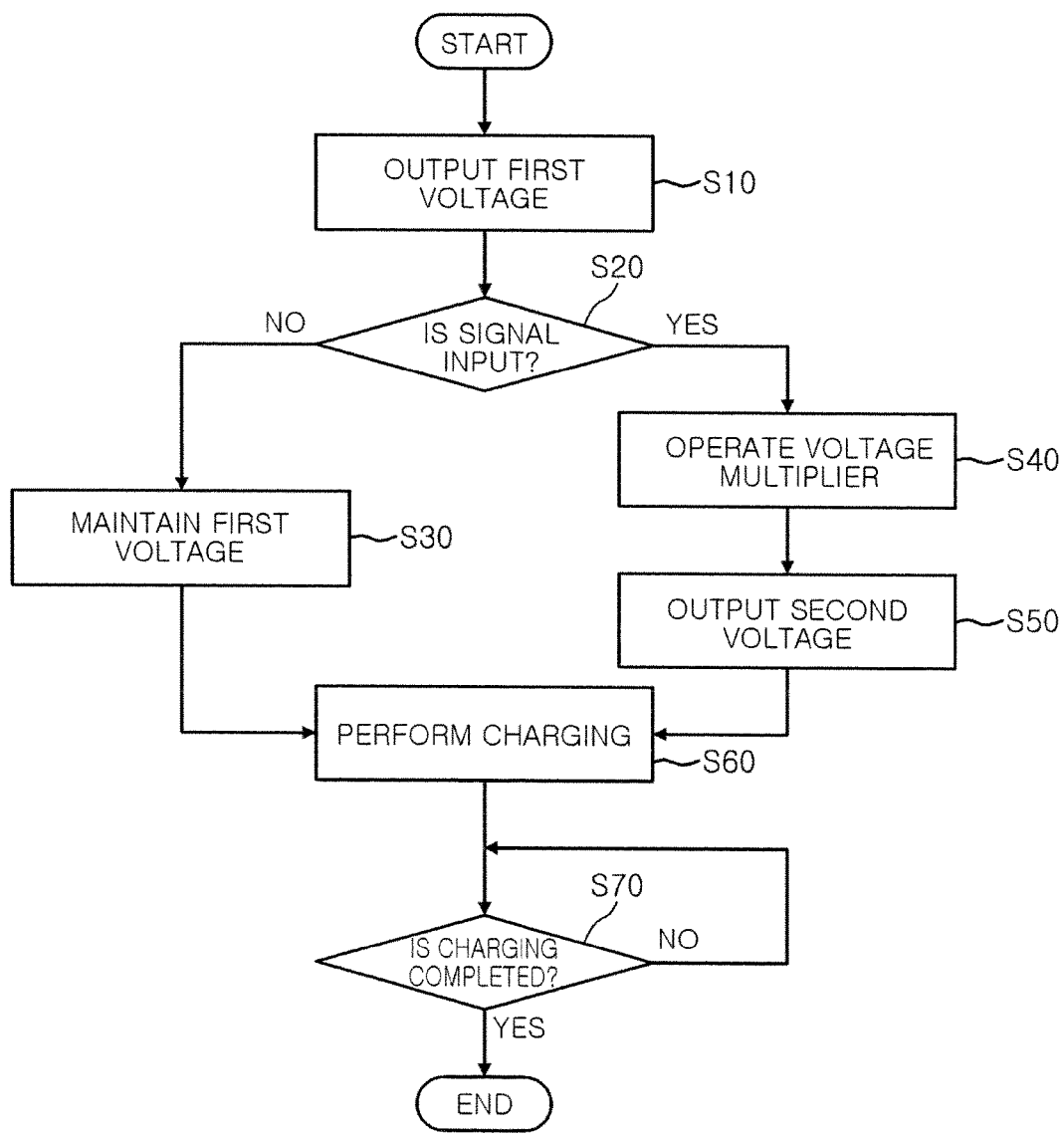
FIG. 3 is a flow chart sequentially illustrating operations of the non-contact type power receiving apparatus according to an exemplary embodiment of the present disclosure.

FIG. 3 is a flow chart sequentially illustrating operations of the non-contact type power receiving apparatus according to an exemplary embodiment of the present disclosure.

A flow chart of the operations of the non-contact type power receiving apparatus described above with reference to FIGS. 1 through 2B is shown in FIG. 3.

That is, the power receiving unit 110 may provide the first charging power having a first voltage to the battery 120 (S10). Then, when the selection signal is input from the battery 120 to the power receiving unit 110 (S20), the rectifying/multiplying unit 112 perform the multiplying operation, such that the power receiving unit 110 may provide the second charging power having a second voltage higher than the first voltage to the battery 120 (S40 and S50).

On the other hand, when the selection signal is not input from the battery 120 to the power receiving unit 110, the first charging power may be maintained.

Figure 4A:
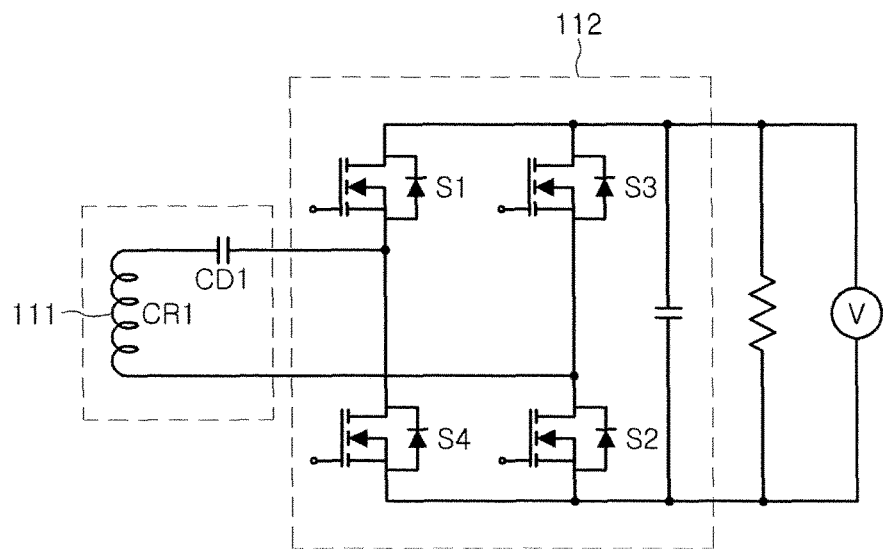
FIG. 4A is a circuit diagram of a power receiving coil unit and rectifying/multiplying unit of FIG. 1 according to an embodiment of the present disclosure.
Figure 4B:
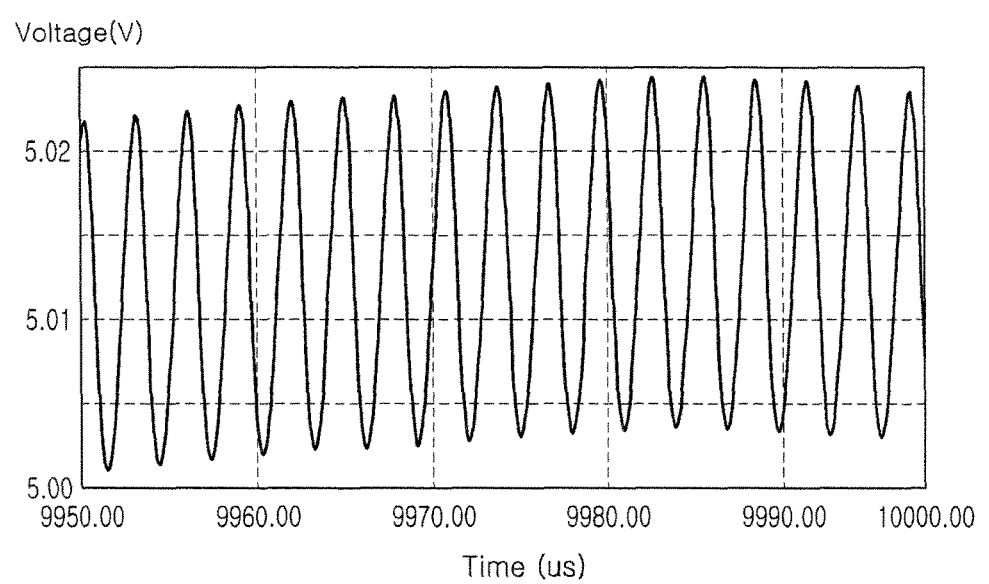
FIG. 4B illustrates a switching operation of the circuit of FIG. 4A.
Figure 4C:
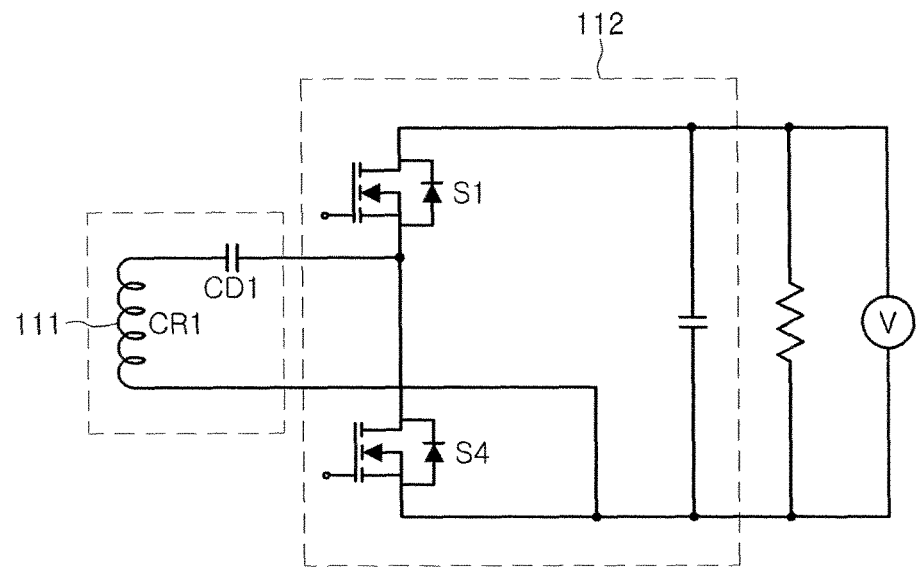
FIG. 4C is a circuit diagram of a power receiving coil unit and rectifying/multiplying unit of FIG. 1 according to another embodiment of the present disclosure.
Figure 4D:
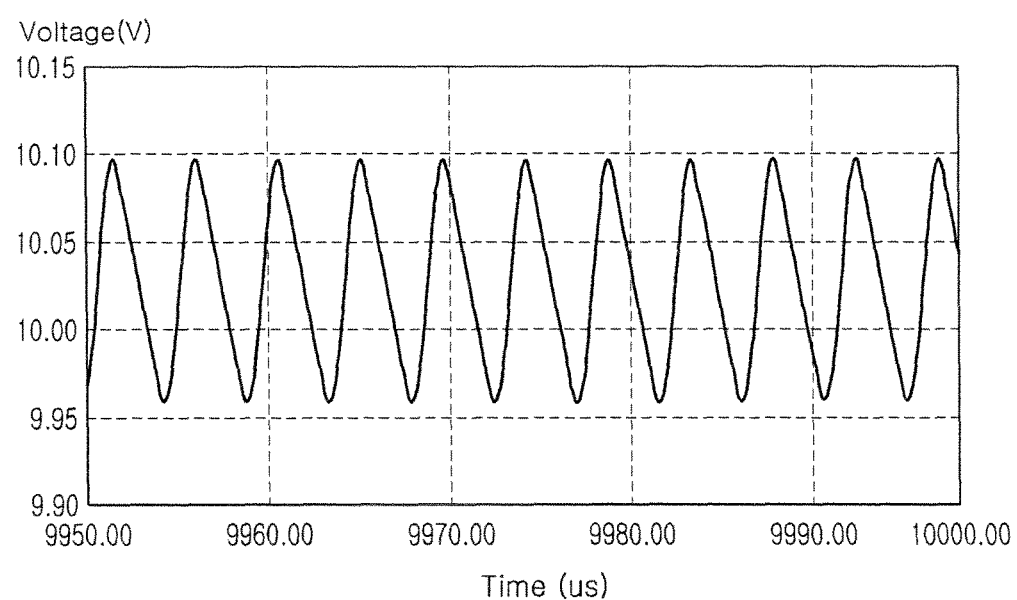
FIG. 4D illustrates a switching operation of the circuit of FIG. 4C.

The charging power having a set voltage level may be provided to the battery 120, such that the charging may be performed (S60), and the charging may be performed until the charging of the power in the battery 120 is completed (S70). FIG. 4A is a circuit diagram of a power receiving coil unit and rectifying/multiplying unit of FIG. 1 according to an embodiment of the present disclosure. FIG. 4B illustrates a switching operation of the circuit of FIG. 4A. The specification does not explain what is VP2 in the present FIG. 4A. FIG. 4C is a circuit diagram of a power receiving coil unit and rectifying/multiplying unit of FIG. 1 according to another embodiment of the present disclosure. FIG. 4D illustrates a switching operation of the circuit of FIG. 4C.

Referring to FIG. 4A, the power receiving coil unit 110 may include a power receiving coil CR1 and a capacitor CD1.

The power receiving coil CR1 may receive power from an external power transmitting coil in a non-contact scheme, and the capacitor CD1 may block a direct current (DC) component of the power received in the power receiving coil CR1 so as not to be transferred to the rectifying/multiplying unit 112. In addition, a capacitance of the capacitor CD1 may form LC resonance with an inductance of the power receiving coil CR1 and form a resonant frequency to receive the power at the resonant frequency at the time of receiving the power, wherein the resonant frequency may be varied.

The rectifying/multiplying unit 112 may include a plurality of switches differently setting transfer paths of the power depending on controlling of the controlling unit 114.

For example, the rectifying/multiplying unit 112 may include first to fourth switches S1 to S4, wherein the first switch S1 and the fourth switch S4 may be connected to each other in series and the third switch S3 and the second switch S2 may be connected to each other in series.

The first switch S1 and the fourth switch S4 may be connected in parallel with the third switch S3 and the second switch S2.

One end of the capacitor CD1 may be connected to a connection point between the first switch S1 and the fourth switch S4, and the other end of the capacitor CD1 may be connected to one end of the power receiving coil CR1.

A connection point between the third switch S3 and the second switch S2 may be connected to the other end of the power receiving coil CR1.

At the time of performing the rectifying operation depending on the controlling of the controlling unit 114, an operation of switching on the first and second switches S1 and S2 and switching off the third and fourth switches S3 and S4 and an operation of switching off the first and second switches S1 and S2 and switching on the third and fourth switches S3 and S4 may be alternately performed.

Figure 5A:
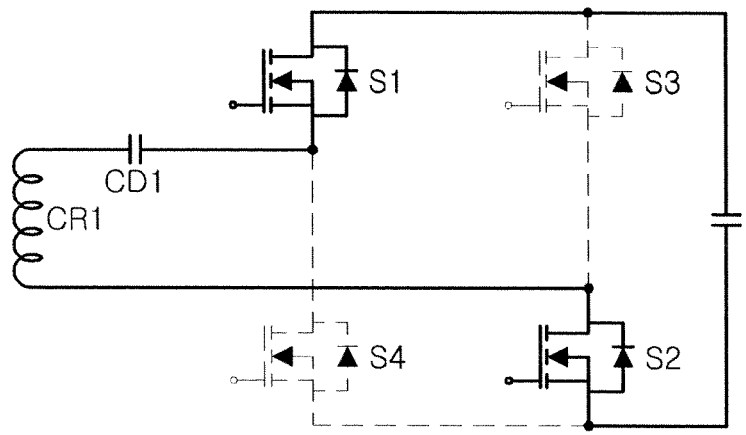
FIGS. 5A and 5B are circuit diagrams illustrating a rectifying operation of the non-contact type power receiving apparatus according to an exemplary embodiment of the present disclosure.
Figure 5B:
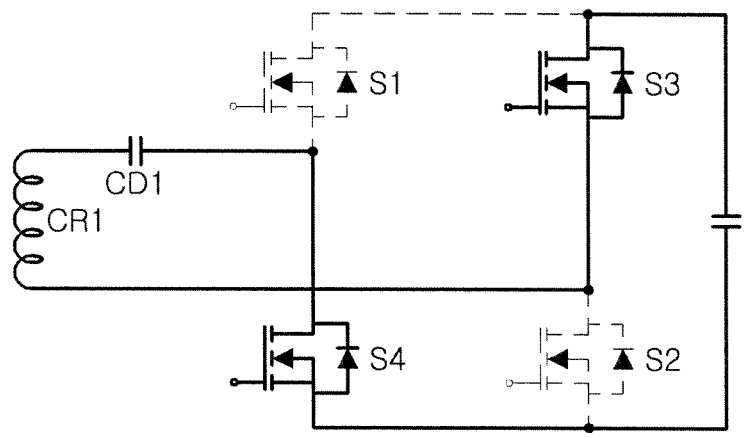

FIGS. 5A and 5B are circuit diagrams of the receiving coil unit and the rectifying/multiplying unit of FIG. 1 according to an example of the present disclosure.

Referring to FIGS. 5A and 5B, since power received in the power receiving coil CR1 is an alternating current (AC) power, the first and second switches S1 and S2 may be switched on and the third and fourth switches S3 and S4 may be switched off in a positive half period of the AC power and the first and second switches S1 and S2 may be switched off and the third and fourth switches S3 and S4 may be switched on in a negative half period of the AC power to rectify the received power and transfer the rectified power to the converting unit 113.

Meanwhile, referring to FIG. 4B, for example, the first and fourth switches S1 and S4 may be alternately switched on or off in order to perform the rectifying and multiplying operation depending on the controlling of the controlling unit 114. In this case, the second switch S2 may be maintained in a switched-on state and the third switch S3 may be switched off. The above-mentioned alternate switching operation and switched-on or switched-off state maintaining operation may be variously set in each switch, which will be described with reference to FIGS. 6A through 9B.

Figure 6A:
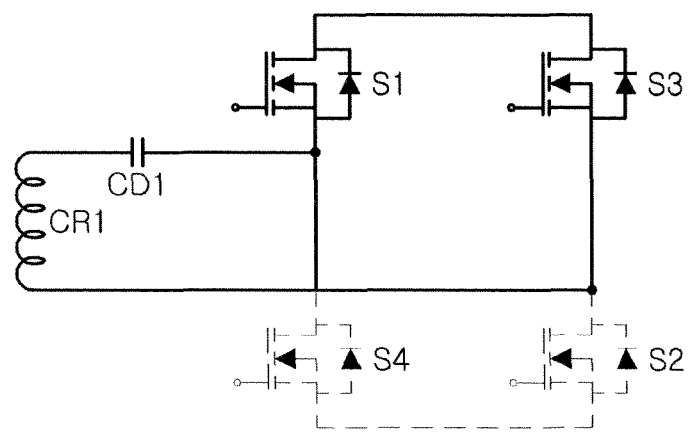
FIGS. 6A and 6B are circuit diagrams illustrating a multiplayer operation of the non-contact type power receiving apparatus according to an exemplary embodiment of the present disclosure.
Figure 6B:
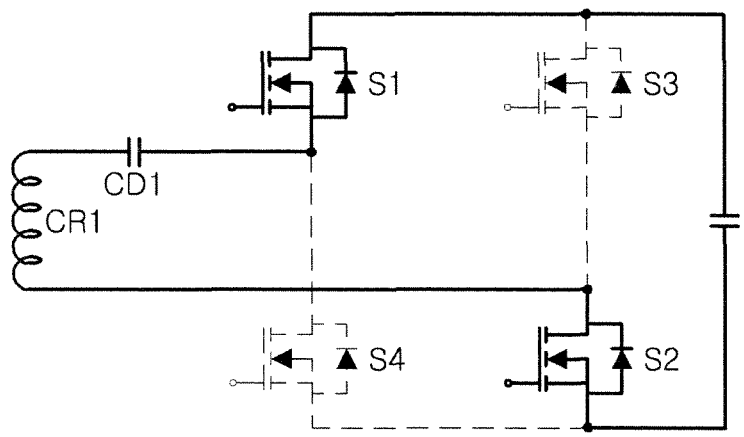

FIGS. 6A and 6B are circuit diagrams of the receiving coil unit and the rectifying/multiplying unit of FIG. 1 according to another example of the present disclosure.

Referring to FIGS. 6A and 6B, the first switch S1 may be maintained in a switched-on state, the fourth switch S4 may be maintained in a switched-off state, and the third and second switches S3 and S2 may be alternately switched on/off, depending on the controlling of the controlling unit 114.

Referring to FIG. 6A, the third switch S3 may be switched on, such that electric charges of the received power may be charged in the capacitor CD1, and referring to FIG. 6B, the second switch S2 may be switched on, such that a transfer path of the electric charges charged in the capacitor CD1 may be formed, whereby a voltage level of the power transferred to the converting unit 113 may be multiplied.

Figure 7A:
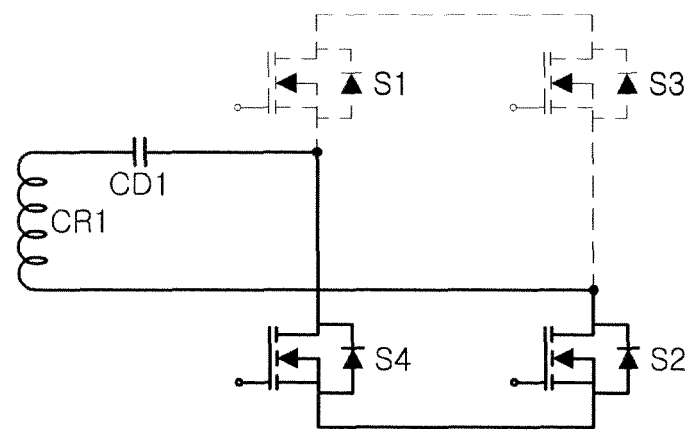
FIGS. 7A and 7B are circuit diagrams illustrating a multiplying operation of a non-contact type power receiving apparatus according to another exemplary embodiment of the present disclosure.
Figure 7B:
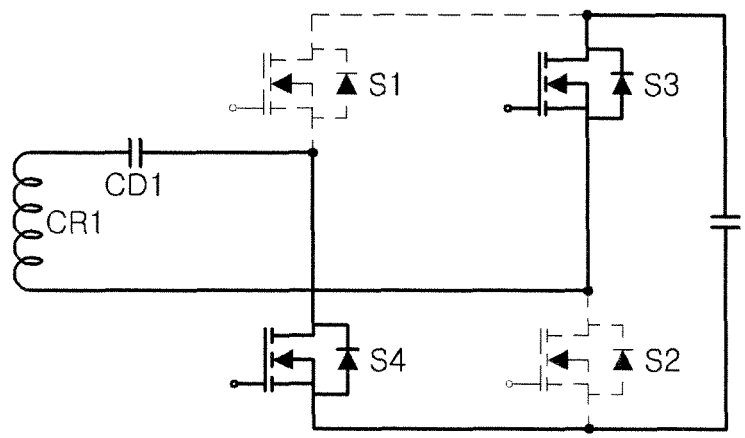

FIGS. 7A and 7B are circuit diagrams of the receiving coil unit and the rectifying/multiplying unit of FIG. 1 according to another example of the present disclosure.

Referring to FIGS. 7A and 7B, the fourth switch S4 may be maintained in a switched-on state, the first switch S1 may be maintained in a switched-off state, and the second and third switches S2 and S3 may be alternately switched on/off, depending on the controlling of the controlling unit 114.

Referring to FIG. 7A, the second switch S2 may be switched on, such that the electric charges of the received power may be charged in the capacitor CD1, and referring to FIG. 7B, the third switch S3 may be switched on, such that a transfer path of the electric charges charged in the capacitor CD1 may be formed, whereby a voltage level of the power transferred to the converting unit 113 may be multiplied.

Figure 8A:
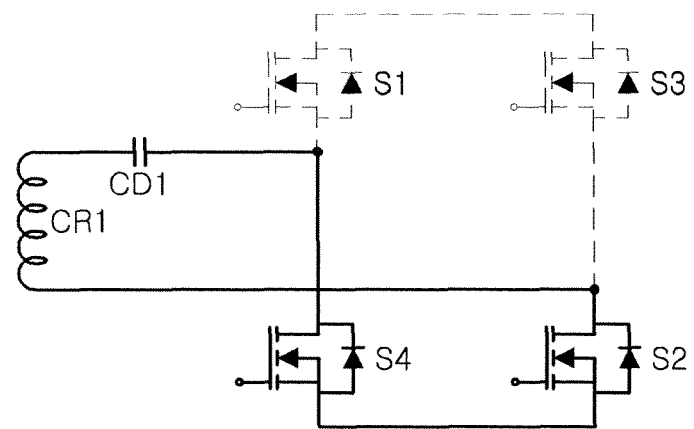
FIGS. 8A and 8B are circuit diagrams illustrating a multiplying operation of a non-contact type power receiving apparatus according to another exemplary embodiment of the present disclosure.
Figure 8B:
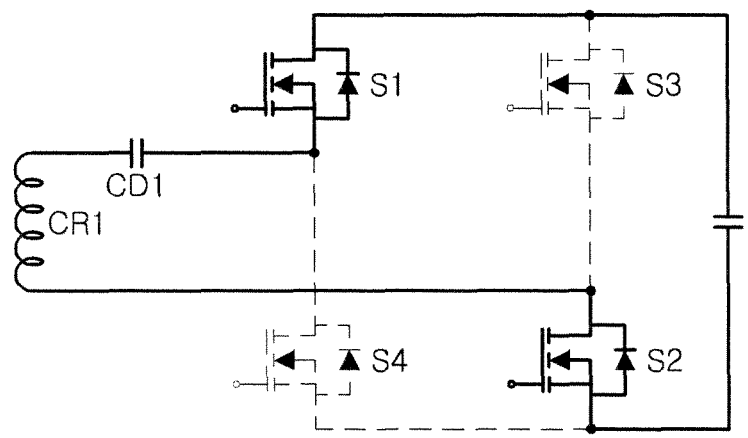

FIGS. 8A and 8B are circuit diagrams of the receiving coil unit and the rectifying/multiplying unit of FIG. 1 according to another example of the present disclosure.

Referring to FIGS. 8A and 8B, the second switch S2 may be maintained in a switched-on state, the third switch S3 may be maintained in a switched-off state, and the fourth and first switches S4 and S1 may be alternately switched on/off, depending on the controlling of the controlling unit 114.

Referring to FIG. 8A, the fourth switch S4 may be switched on, such that the electric charges of the received power may be charged in the capacitor CD1, and referring to FIG. 8B, the first switch S1 may be switched on, such that a transfer path of the electric charges charged in the capacitor CD1 may be formed, whereby a voltage level of the power transferred to the converting unit 113 may be multiplied.

Figure 9A:
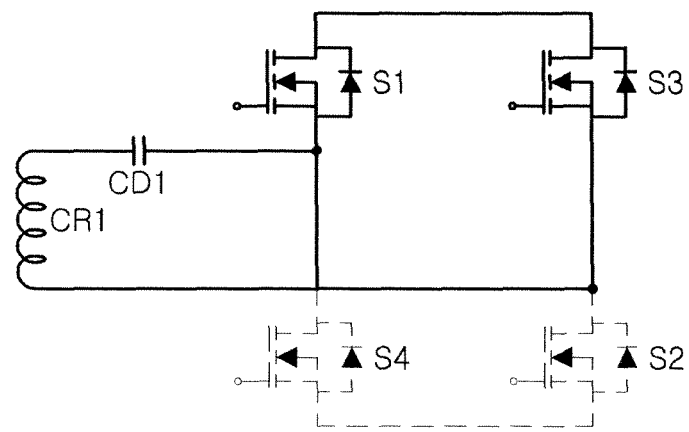
FIGS. 9A and 9B are circuit diagrams illustrating a multiplying operation of a non-contact type power receiving apparatus according to another exemplary embodiment of the present disclosure.
Figure 9B:
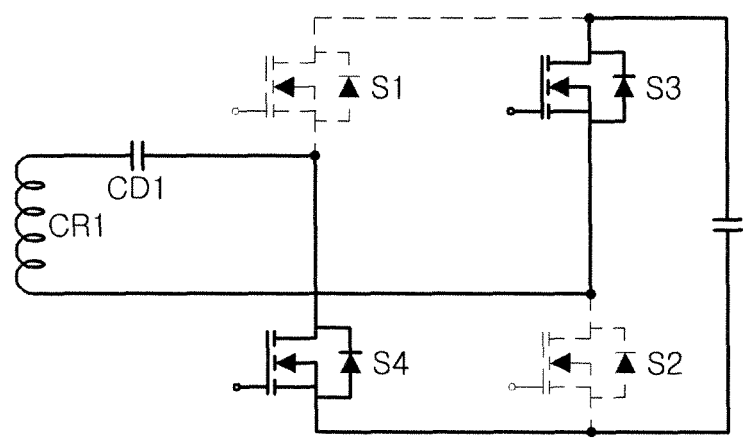

FIGS. 9A and 9B are circuit diagrams of the receiving coil unit and the rectifying/multiplying unit of FIG. 1 according to another example of the present disclosure.

Referring to FIGS. 9A and 9B, the third switch S3 may be maintained in a switched-on state, the second switch S2 may be maintained in a switched-off state, and the first and fourth switches S1 and S4 may be alternately switched on/off, depending on the controlling of the controlling unit 114.

Referring to FIG. 9A, the first switch S1 may be switched on, such that the electric charges of the received power may be charged in the capacitor CD1, and referring to FIG. 9B, the fourth switch S4 may be switched on, such that a transfer path of the electric charges charged in the capacitor CD1 may be formed, whereby a voltage level of the power transferred to the converting unit 113 may be multiplied.

As set forth above, according to exemplary embodiments of the present disclosure, one rectifying circuit may be used in common in batteries having two different rated voltages, such that a cost required for manufacturing the power receiving apparatus and a volume of the power receiving apparatus may be decreased.

While exemplary embodiments have been shown and described above, it will be apparent to those skilled in the art that modifications and variations could be made without departing from the scope of the present invention as defined by the appended claims.

What is claimed is:

1. A non-contact type power receiving apparatus comprising:
    a power receiving coil unit configured to receive power in a non-contact scheme;
    a rectifying/multiplying unit configured to rectify the received power depending on controlling thereof and selectively multiply a voltage level of the rectified power; and
    a controller configured to selectively control a rectifying operation or a multiplying operation of the rectifying/multiplying unit depending on a selection signal,
    wherein the rectifying/multiplying unit comprises
    first and fourth switches connected to each other in series and having a connection point there between connected to one end of the power receiving coil unit, and
    third and second switches connected to each other in series, having a connection point there between connected to the other end of the power receiving coil unit, and connected to the first and fourth switches in parallel, and
    wherein one of the first and fourth switches is switched on, the other of the first and fourth switches is switched off, and the second and third switches are alternately switched for a period of time in which the first and fourth switches are switched on or off, depending on the controlling of the controller, thereby rectifying the received power from the power receiving coil and multiplying a voltage level of the rectified power.

2. The non-contact type power receiving apparatus of claim 1, wherein the rectifying/multiplying unit comprises switches switched depending on the controlling of the controller to form a first transfer path rectifying the received power from the power receiving coil unit and a second transfer path rectifying and multiplying the received power and different from the first transfer path.

3. The non-contact type power receiving apparatus of claim 1, wherein the power receiving coil unit comprises:
    a power receiving coil configured to receive the power in the non-contact scheme; and
    a capacitor configured to block a direct current (DC) component of the power received in the power receiving coil.

4. The non-contact type power receiving apparatus of claim 1, wherein the third and fourth switches are switched off in response to the first and second switches being switched on and are switched on in response to the first and second switches being switched off, depending on the controlling of the controller, thereby rectifying the received power from the power receiving coil.

5. A non-contact type power receiving apparatus comprising:
   a power receiving coil unit configured to receive power in a non-contact scheme;
   a rectifying/multiplying unit configured to rectify the received power depending on controlling thereof and selectively multiply a voltage level of the rectified power; and
   a controller configured to selectively control a rectifying operation of a multiplying operation of the rectifying/multiplying unit depending on a selection signal,
   wherein the rectifying/multiplying unit comprises
      first and fourth switches connected to each other in series and having a connection point there between connected to one end of the power receiving coil unit, and
      third and second switches connected to each other in series, having a connection point there between connected to the other end of the power receiving coil unit, and connected to the first and fourth switches in parallel, and
   wherein one of the second and third switches is switched on, the other of the second and third switches is switched off, and the first and fourth switches are alternately switched for a period of time in which the second and third switches are switched on or off, depending on the controlling of the controller, thereby rectifying the received power from the power receiving coil and multiplying a voltage level of the rectified power.

6. The non-contact type power receiving apparatus of claim 3, wherein the capacitor is charged with electric charges of the received power from the power receiving coil in response to the second switch being switched on and discharges the electric charges charged therein in response to the third switch being switched on, thereby multiplying the voltage level of the rectified power, or
   is charged with the electric charges of the received power from the power receiving coil in response to the third switch being switched on and discharges the electric charges charged therein in response to the second switch being switched on, thereby multiplying the voltage level of the rectified power.

7. The non-contact type power receiving apparatus of claim 5,
   wherein the power receiving coil unit comprises
      a power receiving coil configured to receive the power in the non-contact scheme; and
      a capacitor configured to block a direct current (DC) component of the power received in the power receiving coil, and
   wherein the capacitor is charged with electric charges of the received power from the power receiving coil in response to the first switch being switched on and discharges the electric charges charged therein in response to the fourth switch being switched on, thereby multiplying the voltage level of the rectified power, or
   the capacitor is charged with the electric charges of the received power from the power receiving coil in response to the fourth switch being switched on and discharges the electric charges charged therein in response to the first switch being switched on, thereby multiplying the voltage level of the rectified power.

8. The non-contact type power receiving apparatus of claim 1, further comprising a converter configured to convert the power from the rectifying/multiplying unit into charging power and transfer the charging power to a battery.

9. A non-contact type power receiving apparatus comprising:
   a power receiving unit configured to output one of a first power generated by rectifying power received in a non-contact scheme and a second power generated by rectifying and multiplying the power depending on a selection signal; and
   a battery configured to provide the selection signal depending on a preset rated voltage to thereby be charged with power corresponding to the rated voltage, of the first power and the second power.

10. The non-contact type power receiving apparatus of claim 9, wherein the power receiving unit comprises:
    a power receiving coil unit configured to receive the power in a non-contact scheme;
    a rectifying/multiplying unit configured to rectify the received power depending on controlling thereof and selectively multiplying a voltage level of the rectified power;
    a converter configured to convert the power from the rectifying/multiplying unit into charging power; and
    a controller configured to selectively control a rectifying operation or a multiplying operation of the rectifying/multiplying unit to be performed depending on the selection signal.

11. The non-contact type power receiving apparatus of claim 10, wherein the power receiving coil unit comprises:
    a power receiving coil configured to receive the power in the non-contact scheme; and
    a capacitor configured to block a DC component of the power received in the power receiving coil.

12. The non-contact type power receiving apparatus of claim 10, wherein the rectifying/multiplying unit comprises switches switched depending on controlling thereof to form a first transfer path rectifying the received power from the power receiving coil unit and a second transfer path rectifying and multiplying the received power and different from the first transfer path.

13. The non-contact type power receiving apparatus of claim 12, wherein the rectifying/multiplying unit comprises:
    first and fourth switches connected to each other in series and having a connection point there between connected to one end of the power receiving coil unit; and
    third and second switches connected to each other in series, having a connection point there between connected to the other end of the power receiving coil unit, and connected to the first and fourth switches in parallel.

14. The non-contact type power receiving apparatus of claim 13, wherein the third and fourth switches are switched off in response to the first and second switches being switched on and are switched on in response to the first and second switches being switched off, depending on the controlling of the controller, thereby rectifying the received power from the power receiving coil.

15. The non-contact type power receiving apparatus of claim 13, wherein one of the first and fourth switches is switched on, the other of the first and fourth switches is switched off, and the second and third switches are alternately switched for a period of time in which the first and fourth switches are switched on or off, depending on the control of the controller, thereby rectifying the received power from the power receiving coil and multiplying the voltage level of the rectified power.

16. The non-contact type power receiving apparatus of claim 13, wherein one of the second and third switches is switched on, the other of the second and third switches is switched off, and the first and fourth switches are alternately switched for a period of time in which the second and third switches are switched on or off, depending on the controlling of the controller, thereby rectifying the received power from the power receiving coil and multiplying a voltage level of the rectified power.

17. The non-contact type power receiving apparatus of claim 15, wherein the power receiving coil unit comprises:
a capacitor configured to block a DC component of the power received in the power receiving coil, and
the capacitor is charged with electric charges of the received power from the power receiving coil in response to the second switch being switched on and discharges the electric charges charged therein in response to the third switch being switched on, thereby multiplying the voltage level of the rectified power, or
is charged with the electric charges of the received power from the power receiving coil in response to the third switch being switched on and discharges the electric charges charged therein in response to the second switch being switched on, thereby multiplying the voltage level of the rectified power.

18. The non-contact type power receiving apparatus of claim 16, wherein the power receiving coil unit comprises:
a capacitor configured to block a DC component of the power received in the power receiving coil, and
the capacitor is charged with electric charges of the received power from the power receiving coil in response to the first switch being switched on and discharges the electric charges charged therein in response to the fourth switch being switched on, thereby multiplying the voltage level of the rectified power, or
the capacitor is charged with the electric charges of the received power from the power receiving coil in response to the fourth switch being switched on and discharges the electric charges charged therein in response to the first switch being switched on, thereby multiplying the voltage level of the rectified power.

* * * * *